May 17, 1938.   H. J. L. FRANK ET AL   2,117,552
TROLLEY AND CURRENT COLLECTOR MEANS
Original Filed May 25, 1934   2 Sheets-Sheet 1

INVENTORS
Harrison J. L. Frank
and Joseph A. Messing
BY
Daniel G. Cullen
ATTORNEY.

May 17, 1938.  H. J. L. FRANK ET AL  2,117,552
TROLLEY AND CURRENT COLLECTOR MEANS
Original Filed May 25, 1934  2 Sheets-Sheet 2
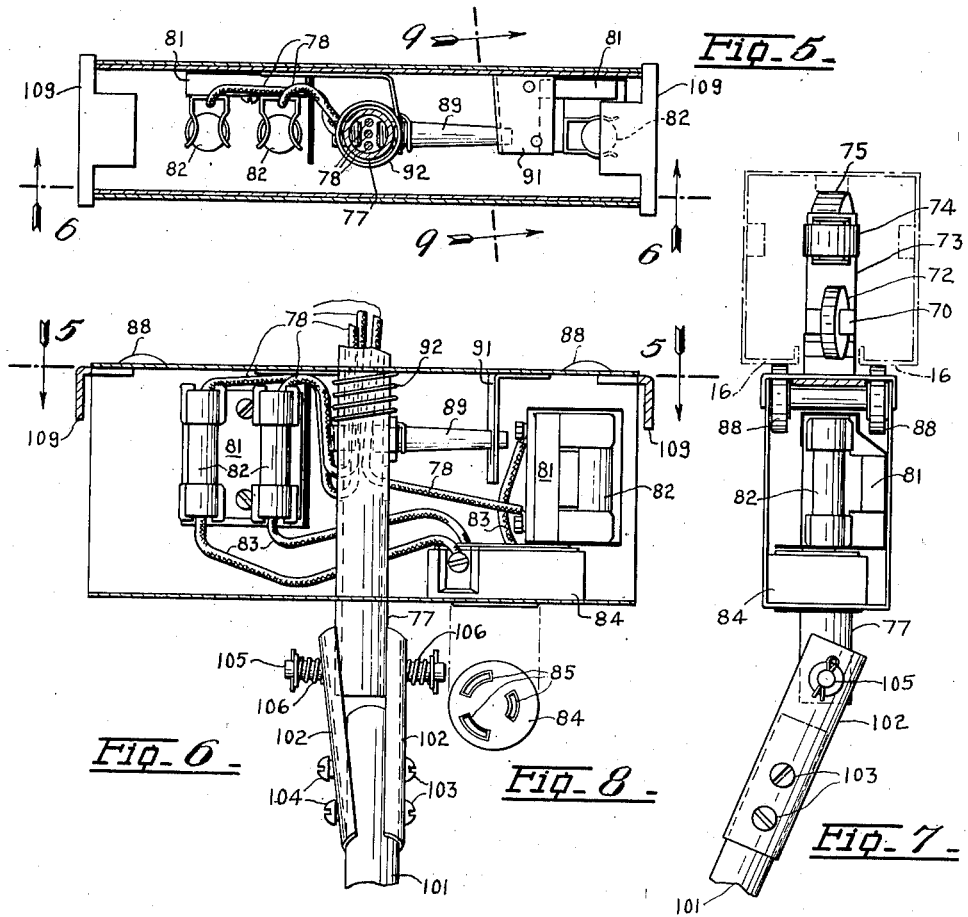
INVENTORS
Harrison J. L. Frank
BY and Joseph A. Mening
Daniel G. Cullen
ATTORNEY.

Patented May 17, 1938

2,117,552

UNITED STATES PATENT OFFICE 2,117,552

TROLLEY AND CURRENT COLLECTOR MEANS

Harrison J. L. Frank, and Joseph A. Messing, Detroit, Mich.

Original applications May 25, 1934, Serial No. 727,516, now Patent No. 2,018,016, dated October 22, 1935, and May 6, 1935, Serial No. 20,113, now Patent No. 2,052,972, dated September 1, 1936. Divided and this application August 26, 1935, Serial No. 37,953

2 Claims. (Cl. 191—45)

This invention relates to trolley and current collector means, particularly adapted for use in connection with the stationary bus duct of a current distributing system, such as the one previously disclosed in a copending application Serial No. 674,183, filed June 3, 1933, now Patent No. 2,018,846 of October 29, 1935, and the instant application is a division of our prior applications Serial No. 727,516 filed May 25, 1934, now Patent No. 2,018,016 of October 22, 1935, and Serial No. 20,113 filed May 6, 1935, now Patent No. 2,052,972 of September 1, 1936.

The above identified application relates to the bus duct which includes the bus bars from which current is to be taken, while the instant application relates to the trolley and collector means for withdrawing current from the bus duct of that application.

The principal objects of the present invention are to provide trolley and collector means which shall be of light weight and small size, and which have a high degree of economy of manufacture and efficiency of operation.

Objects of the invention, which relate more distinctly to novel and important details of manufacture of the collector means shown and described herein, will be readily apparent upon reference to the following detailed descriptive matter relating to the appended drawings.

Referring to these drawings it will be seen that—

Fig. 5 is a plan section as if on line 5—5 of Fig. 6;

Fig. 6 is an elevational section, on line 6—6 of Fig. 5, of the portion of the trolley that is outside the duct;

Fig. 7 is an end section of the trolley, with parts thereof shown in the position they occupy as the trolley is being inserted into a duct;

Fig. 8 is a plan view of a receptacle part of the trolley of Fig. 6;

Fig. 9 is a view like that of Fig. 4 but showing the parts thereof in a different position, before the trolley is inserted into the duct;

Fig. 10 shows the cooperation between certain parts of the trolley of Figs. 1–3, namely a box portion and its cover.

For use with the bus duct heretofore mentioned as being shown in application Serial No. 674,183, there have been designed trolleys and plug collectors of various forms, and one of these will now be described in detail.

The collector of Figs. 1–10

In these figures there is disclosed a collector or trolley which can be inserted into or withdrawn from the duct of application Serial No. 674,183 at any point of the latter, and in this regard the trolley of Figs. 1–10 more or less resembles the trolleys of Patent No. 1,819,886, which can be associated with their ducts at any point of the latter. Referring to Figs. 1 to 10 it will be seen that the trolley includes a duct-contained part referenced generally "A" and an outside part, referenced generally "B", the duct-contained part being in the nature of a T-shaped bar, whose vertical post extends through and is journalled in the horizontal walls of the box which encloses most of the parts outside of the duct.

Figure 1:
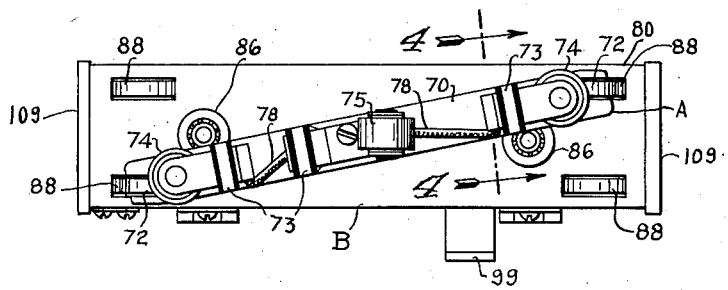
Figs. 1–3 show one form of trolley in top plan, side elevation, and end view, respectively, with the parts being shown in the position they occupy after the trolley has been inserted into a duct.

The duct-contained part A includes a bar 70 of sufficient weight and strength to be relatively rigid, and on the ends of this bar are journalled, on horizontal trunnions 71, the riding wheels 72 of the device, adapted to ride on the rails 16 of the duct. The wheels 72 are not in line with the bar 70 but are somewhat askew of it, as seen in Fig. 1. Projecting upwardly from the bar 70 are three posts formed integrally therewith and referenced 73. The two outer posts support vertically trunnioned collector wheels 74 and the inner post supports a resiliently and horizontally journalled collector wheel 75, suitable insulation, not referenced, being provided between the collector wheels and these posts.

Integrally secured to the bar 70 is a downwardly projecting hollow post 77 through which pass the three conductors 78 electrically and mechanically connected to the collector wheels aforesaid, through suitable binding posts.

The post 77 passes through the top and bottom horizontal walls of a sheet metal open ended, and open sided box 80 which is disposed outside of the duct and which box contains insulating blocks 81 (Fig. 6) suitably mounted therein and suitably insulated from the boxes as well as from one another. These blocks are provided with fuse clips in which are disposed cartridge fuses 82 and to one set of these fuse clips are connected the ends of the conductors 78, these passing down through the post 77 and out through side wall openings thereof to the binding posts of the blocks 81. The other set of fuse clips of these blocks 81 are connected by leads 83 to the binding posts of a receptacle 84 whose enclosed contacts are accessible from the outside of the box through the polarizing slots 85 of the receptacle itself, the receptacle, it being observed, being supported on, and in part projecting through an aperture in the bottom wall of the box.

The top wall of the box is provided with a pair of vertically trunnioned, horizontally disposed riding wheels 86 adapted to engage the flanges of the bottom opening of the duct to assist in guiding the trolley along the duct.

Further, just under the top wall of the box are fixedly and transversely disposed horizontal axles 87 upon which are trunnioned vertical wheels 88 which project through slots in the top wall of the box and bear against the under surfaces of the bottom wall of the duct to assist in supporting the box and guiding it with respect to the duct.

The hollow post 77 of the portion A projects through openings in the top and bottom walls of the box, and the post and the box are relatively guided by virtue of this construction. To key the post to the box so that they are fixed relatively to each other in angular position, and for purposes to be described, to the post is rigidly secured a pin 89 which projects transversely therefrom and into the elbow-shaped slot 90 of a metal plate 91, secured to the side of the box. A coil spring 92 is disposed between the pin 89 and the top surface of the box, for purposes also to be described.

Hinged to the box at the dihedral angle at the top and one side of the box, which side is completely open except for its margins, and thus providing access to the fuses and other parts in the box, is a closure plate 95 having ends 96, the plate and its ends closing the otherwise open side and ends of the box. The closure plate or cover is provided with a spring latch 97, having a teat 98 cooperating with a hole in the bottom wall of the box to maintain the cover closed normally, and is also provided on its top edge with an ogee-shaped piece 99 for purposes to be described.

Figure 2:
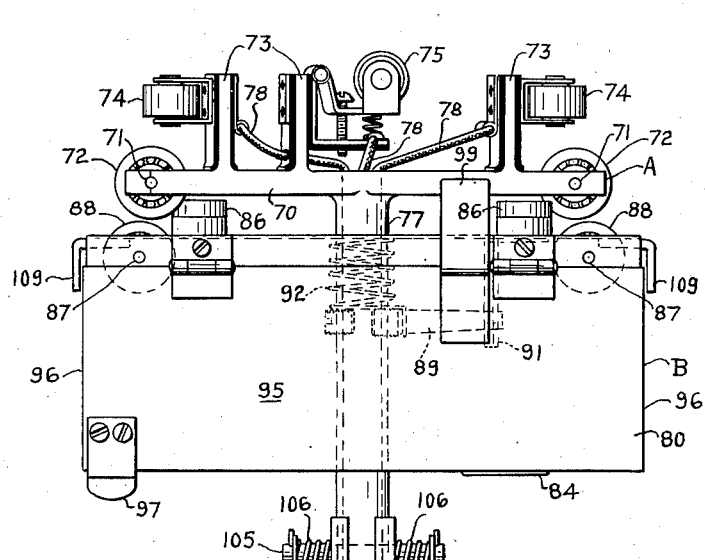
Figure 3:
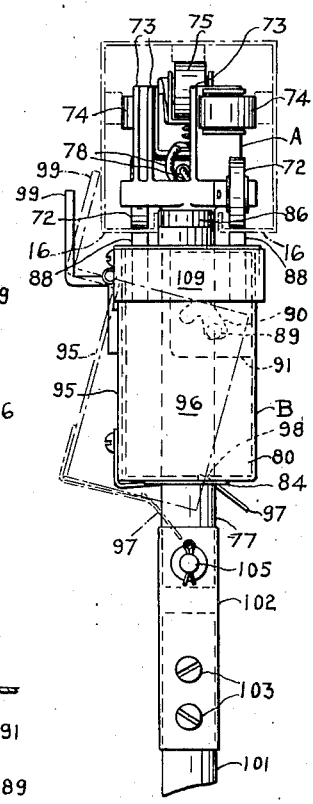
Figure 4:
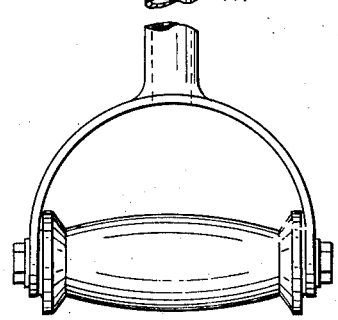
Fig. 4 is a detailed section as if on lines 4—4 of Fig. 1, with the parts thereof shown in the position they occupy when the trolley is in operative assembly with a duct.

The closure plate may be swung to the position shown in Fig. 10 in which case it exposes the interior of the box, or it may be allowed to remain in the position of Fig. 2 (full lines Fig. 3) close to the box to close the open side and ends of the latter.

The post 77, as stated above, projects through the bottom of the box and to its lower end is hinged an elongated handle 101. The hinge includes a pair of channelled plates 102, one of which is rigidly fastened to the handle by screws 103, the other of which is loosely fastened to the handle by screws 104. The plates 102 are resiliently connected to the post end by a pin 105 surrounded by coiled springs 106. The construction permits the post and the handle to move relatively, as when the handle happens to encounter a fixed structure part, while the trolley happens to be moving.

The operation and function of the trolley of Figs. 1 to 10 will now be described. When the trolley is about to be inserted into the duct, the bar 70 occupies a position parallel to the sides of the box, as shown in Figs. 5–7, and the box cover is closed. With the parts in this position the pin 89, projecting from the post 77, will be disposed in the upper end on the slot 90 in the plate 91 that is secured to the box. To insert the trolley into the duct the operator pushes the trolley upwardly through the opening in the bottom wall of the duct.

The bar 70 and all parts thereabove will enter the duct but the box will not. The trolley at this time will not be interlocked to the duct because the parts of portion A are still in line with the opening in the bottom wall of the duct.

To move these parts so that they will move over the flanges at the bottom wall of the duct and so that the bar 70 will straddle the opening at the bottom wall of the duct, with one wheel 72 on one rail 16 and with the other wheel 72 on the other rail 16, it is necessary for the operator to push upwardly on the handle 101. This causes the bar to move up and away from the box, the latter being held stationary, due to the fact that the wheels 88 at the top of the box engage the bottom of the duct. Continued pushing upwardly on the handle causes pin 89 to ride up and out of the upper end of slot 90 of plate 91, and the configuration of this slot is such that pin 89 will rotate and drop into the lower end of this slot, the rotation being effected, in part, by the spring 92. When the pin is in this position the bar and box will have separated and the bar will have been rotated to straddle the duct opening and the parts will be held rigidly interlocked by the stress of the spring 92 in the box. The bar and its parts, as a whole, will be somewhat askew with respect to the duct and with respect to the box, as indicated in Fig. 1.

To remove the trolley from the duct, the handle is pushed upwardly, to separate the box and the bar. Pin 89 will ride up and out of the lower end of the slot 90, and the bar may be rotated back to the position of Fig. 7, to permit removal of the trolley from the duct.

It is observed that when the bar is askew of the duct, as when the trolley is in operative relation with respect thereto, the wheels 72, fixed askew of the bar, will be in proper riding position of the rails 16 of the duct.

It is also observed that the ogee-shaped part 99 of the cover 95 prevents the trolley from being connected to or disconnected from the duct when the cover is swung out of its closing position. It also prevents the cover from being moved to open position while the trolley is in place on a duct, where its parts are connected to the live bus bars in the duct.

The connection between the lower end of the post 77 and the upper end of the handle 101 is provided to prevent injury to the trolley in the event the handle 101 strikes some external part, as for example, a projecting piece of building structure. If the blow on the handle is transverse to the duct, the connection will break and the handle 101 will move. If the blow is in the longitudinal direction of the duct, no harm will result, the trolley merely moving along the duct.

Further, it is observed that the ends of the top wall of the box are turned downwardly, as at 109, to project beyond the ends of the boxes themselves and to act as bumpers for and between the trolleys.

What is claimed is:

1. For use with a duct having a slotted wall, a detachable connector comprising a handle having on its upper end a base and a head, these being transverse to the handle, the head being long and narrow and dimensioned to be insertable into the duct through the slot with its long dimension coincident with the run of the slot and having, on its top, sidewise projecting contacts for engaging side bus bars of the duct when the head is inserted into the duct and rotated therein a slight degree, less than 45°, just enough to straddle the slot, and also having supporting rollers on its bottom for riding on the inside surface of the slotted wall, said rollers being mounted on axles perpendicular to said slot when said head has been thus rotated, the side bus engaging contacts being at all times longitudinally spaced with respect to each other a distance greater than the square root of two times the distance between the side bus bars.

2. For use with duct having a slotted bottom and rails on the sides, a detachable trolley comprising an elongated head having supporting rollers for engaging the bottom and journalled on axles which are perpendicular to the slot when the head is in contact making position, and also having on its top aligned upwardly projecting longitudinally spaced posts, each having a roller projecting sidewise for engaging a side rail, these rollers having a longitudinal spacing greater than the square root of two times the distance between the side rails, means for so positioning said head that the posts thereof align with the slot for passage therethrough and for then simultaneously rotating said head less than 45° so that the posts and their rollers move sidewise and in opposite directions to their respective side rails.

HARRISON J. L. FRANK.
JOSEPH A. MESSING.